United States Patent [19]
Yeths

[11] 3,774,772
[45] Nov. 27, 1973

[54] SWIMMING POOL FILTER

[75] Inventor: Wilmot M. Yeths, South Gate, Calif.

[73] Assignee: Pacific Fabrication, Inc., El Monte, Calif.

[22] Filed: Dec. 9, 1969

[21] Appl. No.: 883,027

[52] U.S. Cl.................. 210/456, 210/169, 210/427, 210/483
[51] Int. Cl............................................. B01d 35/28
[58] Field of Search...................... 210/75, 456, 458, 210/487, 483

[56] References Cited
UNITED STATES PATENTS
3,202,284   8/1965   Wade.................................... 210/75
1,951,484   3/1934   Lawes............................. 210/487 X
3,471,022   10/1969  Conrad........................... 210/487 X Primary Examiner—Charles N. Hart
Assistant Examiner—T. A. Granger
Attorney—Jessup & Beecher

[57] ABSTRACT

An improved swimming pool filter is provided which includes arcuately-shaped internal filter elements, and which is constructed to provide a maximum filter area in a given cylindrical housing volume. The arcuate filter elements are mounted in an upright position in the cylindrical housing, in the illustrated embodiment, and the water enters the bottom of the housing under pressure and is forced up towards the top. The water passes through the filter elements into the interiors thereof, and the interiors are coupled to a header manifold at the top of the housing. The header manifold is coupled to an outlet at the side of the housing. Appropriate filter material, such as diatomaceous earth may be placed in the housing to cover the external surfaces of the filter elements.

2 Claims, 5 Drawing Figures

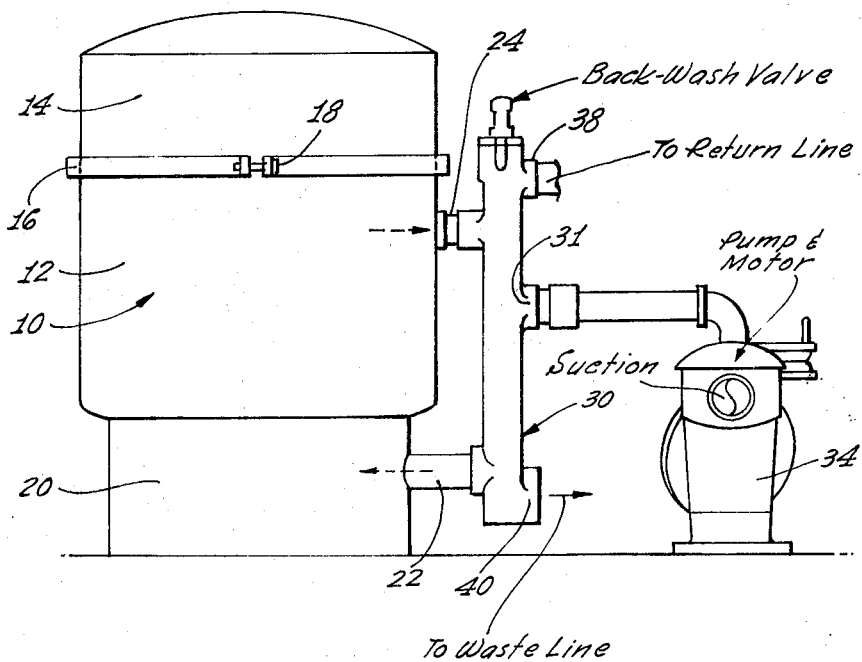
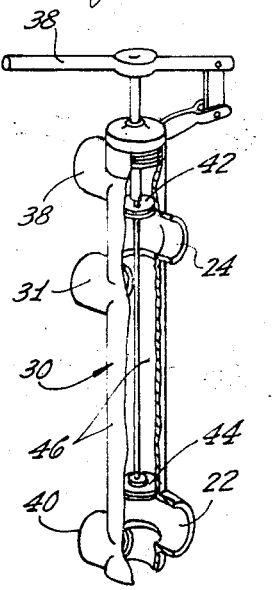
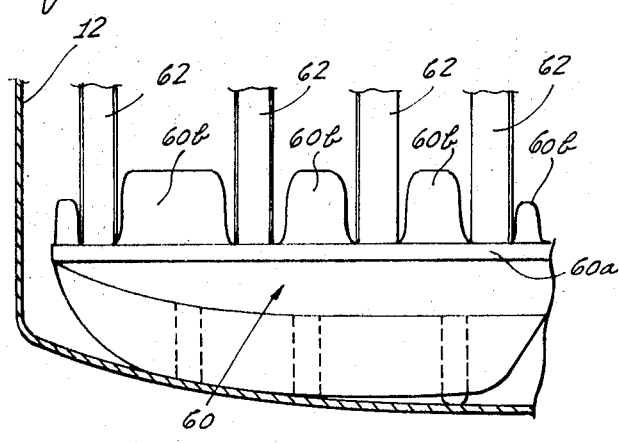
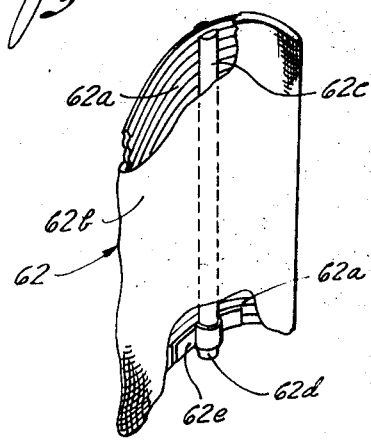
INVENTOR
Wilmot M. Veths
By Keith D. Beecher
ATTORNEYS

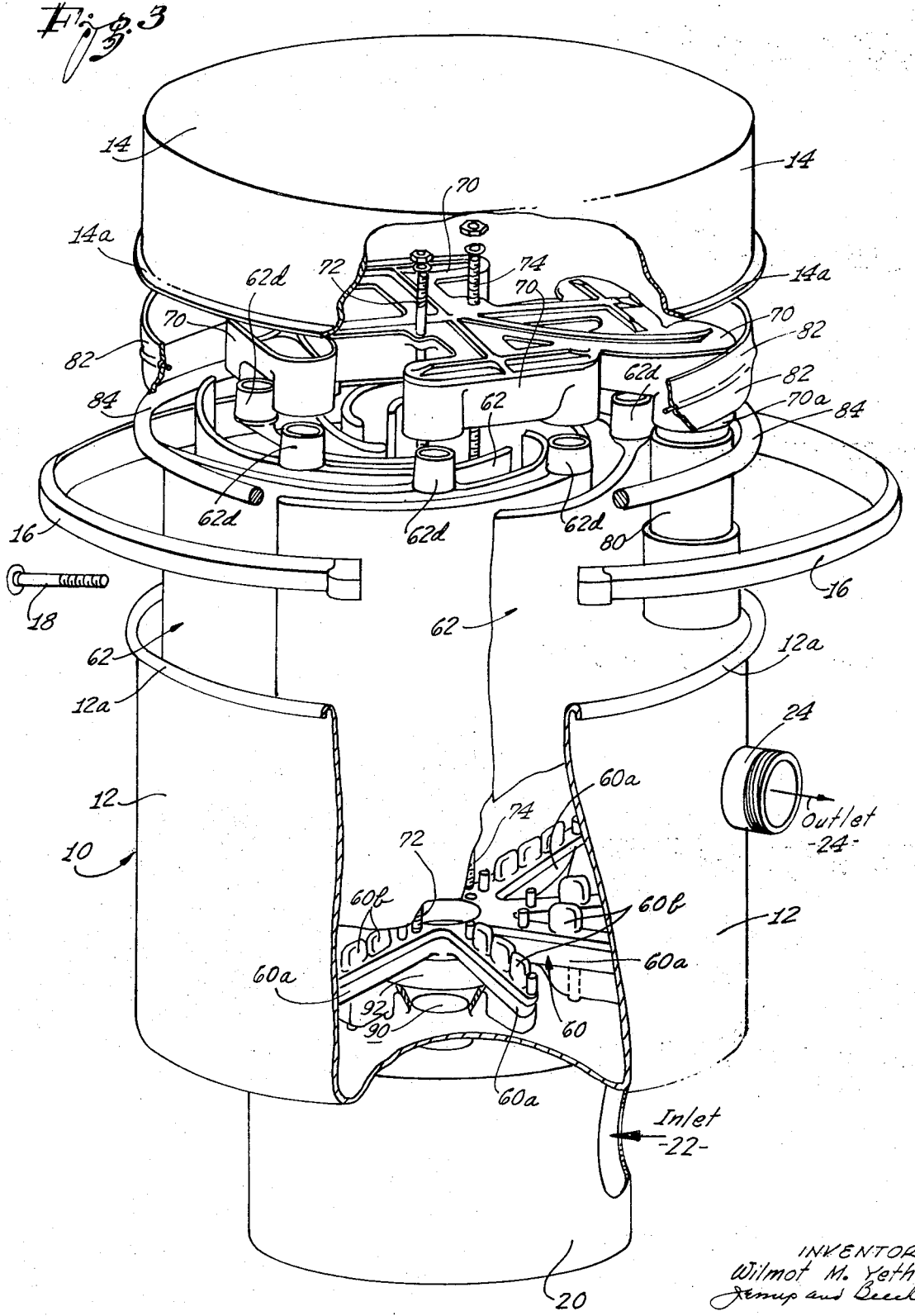

SWIMMING POOL FILTER

BACKGROUND OF THE INVENTION

Filters employed in conjunction with swimming pools usually fall within two general types, that is, sand filters and those employing fabric filter elements. It is usual in the latter type of filter apparatus to include filter material, such as diatomaceous earth, within the housing. The diatomaceous earth is a finely divided powder-like material, and it may be introduced into the housing by causing it to flow into the inlet with the water to be filtered. Sufficient diatomaceous earth is placed in the housing so as to cover the surfaces of the fabric filter elements. The diatomaceous earth serves as a strainer, in conjunction with the filter elements, for removing foreign materials from the water flowing through the filter apparatus.

The filter apparatus of the present invention is of the latter type and, as noted above, it is constructed to include arcuately-shaped upright fabric filter elements, commonly referred to as filter grids, the elements being shaped and mounted in a cylindrical housing so that a maximum of effective filtering area may be provided within a minimum housing volume. The filter apparatus of the invention is constructed so that the water to be filtered enters the bottom of the housing, and the filtered water is removed through a manifold header at the top of the housing. In this way, full use is made of all available filter element surface area, and there is no tendency for air to build up in the housing.

The filter apparatus of the invention is also constructed, in the illustrated embodiment, with the inlet provided adjacent the bottom of the housing, and with the outlet positioned in the side wall of the housing, with the outlet disposed vertically above the inlet. This permits a backwash valve to be conveniently mounted and coupled to the inlet and outlet in a readily accessible position, so that the valve may be operated easily and conveniently whenever a backwashing operation is to be carried out.

BRIEF DESCRIPTION OF THE DRAWINGS

FIG. 1 is a side elevation showing a filter constructed in accordance with the invention in an operating position, and coupled through an appropriate backwash valve to a pump;

FIG. 2 is a side section of the backwash valve of FIG. 1;

FIG. 3 is an exploded side view of the filter, representing one embodiment of the invention, and partly broken away to reveal the internal components of the filter apparatus;

FIG. 4 is a partial view of the lower end of the filter of FIG. 3, and showing the manner in which the arcuate filter grids or elements are supported on a lower header within the filter housing; and FIG. 5 is a perspective representation, partly broken away, of one of the filter grid elements used in the apparatus.

DETAILED DESCRIPTION OF THE ILLUSTRATED EMBODIMENT

The filter apparatus shown in FIG. 1 is designated generally as 10, and it includes a cylindrical housing 12 of a circular cross-section, and a circular cover 14. The cover is held in place on the top of the housing 12 by means, for example, of a fastener strap 16 which is held in place around the rims of the cover and of the housing by means of a fastener bolt 18. The housing 12 is supported on a circular base 20. An inlet means 22 is provided on one side of the base 20, and an outlet means 24 is provided in the wall of the housing 12 in vertical alignment with the inlet 22.

A backwash valve 30 is coupled to the inlet 22 and to the outlet 24. The valve 30 has an inlet which is coupled to the discharge port of a pump 34. A further outlet 38 of the valve is coupled to the return line to the swimming pool, and the suction port of the pump 34 is also coupled back to the swimming pool.

During normal operation of the system, the pump 34 pumps water under pressure through the valve 30, and through the inlet 22 of the filter 10. The filtered water is returned to the valve 30 through the outlet 24, and passes up to the outlet 38 of the valve, and is returned to the pool. During the backwash operation, a lever handle 36 of the valve (FIG. 2) is pulled upwardly so as to move a pair of pistons 42 and 44 within the valve cylinder 46 to the position shown in FIG. 2. In the position shown in FIG. 2, the pressurized liquid from the pump 34 is pumped into the outlet 24 of the filter, and is returned through the inlet 22 of the filter to the waste line through the valve outlet 40.

As shown in FIG. 3, for example, a lower header 60 is positioned on the bottom of the housing 12, the header 60 being formed with a central aperture, and a series of arms extending radially outwardly from the center. The radial arms, designated 60a are each equipped with a series of upstanding protruberances 60b (see also FIG. 4) which serve as lower supports for a plurality of arcuately shaped grid-like filter elements 62 which are supported within the housing, and which rest on the lower header 60, as shown in FIG. 4.

An upper header manifold 70 is also mounted within the housing 12, and is held in place by means of a pair of support rods 72 and 74 which extend through the upper manifold header 70 and which extend down to the bottom of the housing 10 and are threaded into the lower header 60, as shown. Each of the arcuate filter elements 62 comprises, for example, a rigid inner grid member 62a (FIG. 5) which may, for example, be constructed of corrosion-proof high impact plastic material. The grid 62a has a corrugated shape, as shown, and the grid serves to channel the filtered water, after it has passed through the fabric cover 62b to a central tubular member 62c which collects the filtered water and discharges it through an outlet 62d at the top of the filter element. The tubular member 62c is affixed to the grid by means, for example, of an appropriate bracket 62e. The fabric covers 62b may be composed, for example, of Dacron, or other suitable material.

The outlet 62d of the filter element 62 is coupled to the upper header manifold 70, so that the filtered water passing through the filter elements passes through each of the outlets 62d into the interior of the manifold 70. The manifold 70 is coupled to the outlet 24 in the side of the housing 12 through a return pipe 80 which extends from the outlet 70a of the manifold down the side of the housing; the return pipe being coupled through an appropriate 90° elbow (not shown) to the outlet 24.

When the internal components of the filter apparatus are all in place, the cover 14 is moved down so that its lower rim 14a is adjacent the upper rim 12a of the housing 12. A band 82 extends around the outer edges of the rims 12a and 14a, and an O-ring seal 84 extends around the band 82. The strap 16 is then wrapped around the O-ring 84, so as to hold the entire assembly in a closely fit water sealed joint.

The pressurized water from the pump 34 of FIG. 1, which enters the inlet 22, passes into the base 20, and up through an orifice 90 into the bottom of the housing 12. The water then is directed against a baffle 92 which is mounted within the housing in a spaced facing relationship with the orifice 90. The baffle 92 serves to deflect the water radially towards the side wall of the housing 12, the water passes up in the housing and over the external surfaces of all the filter elements 62.

As mentioned above, diatomaceous earth may be introduced into the housing by any known means, and in sufficient quantity to cover the external surfaces of the fabric filter elements 62, and thereby assist in the filtering action. The water flows through the surfaces and into the interiors of the filter elements 62, and the resulting filtered water flows into the manifold 70, and down the return pipe 80 to the outlet 24.

An automatic air relief valve may be provided in the cover 14 so that there is no tendency for air to congregate within the housing. During normal operation, the water is caused to flow up and over all the external surfaces of the filter elements 62 from the bottom to the top of each filter element, and to pass into the interiors of the filter element and up through the filter outlets 62d into the upper manifold 70.

As shown in FIG. 1, the backwash valve 30 may be mounted in a convenient upright position adjacent the side of the filter apparatus, so that a backwash operation may be initiated, by pulling the lever 36 to the position shown in FIG. 2. During the backwash operation, the flow of pressurized water through the filter apparatus is reversed, and the extraneous materials collected within the housing 10 are washed through the outlet 40 of the backwash valve (FIG. 1) to an appropriate waste line.

The invention provides, therefore, an improved filter apparatus which operates with a high degree of efficiency, and which makes optimum usage of filter surface area for minimum volume within the housing.

I claim:

1. Apparatus for removing foreign matters from liquids, including: a base; a housing supported on said base; inlet means positioned on one side of said base for introducing liquid to be filtered into said base; an orifice in the top of said base for introducing the liquid into the bottom of said housing; baffle means mounted in said housing and facing said orifice for directing the inlet water in radial directions through 360° towards the side wall of said housing; an upper manifold mounted in said housing; a plurality of arcuit-shaped filter elements mounted in an upright overlapping relationship in said housing for passing the aforesaid liquid from their external surfaces into the respective interiors thereof; conduit means coupling the interiors of said filter elements to said upper manifold header; outlet means positioned in the wall of said housing in vertical alignment with said inlet means; and further conduit means coupling said upper manifold header to said outlet means.

2. The apparatus defined in claim 1, in which said housing and said base each has a cylindrical configuration with a circular cross-section.

* * * * *